Patented Sept. 20, 1949

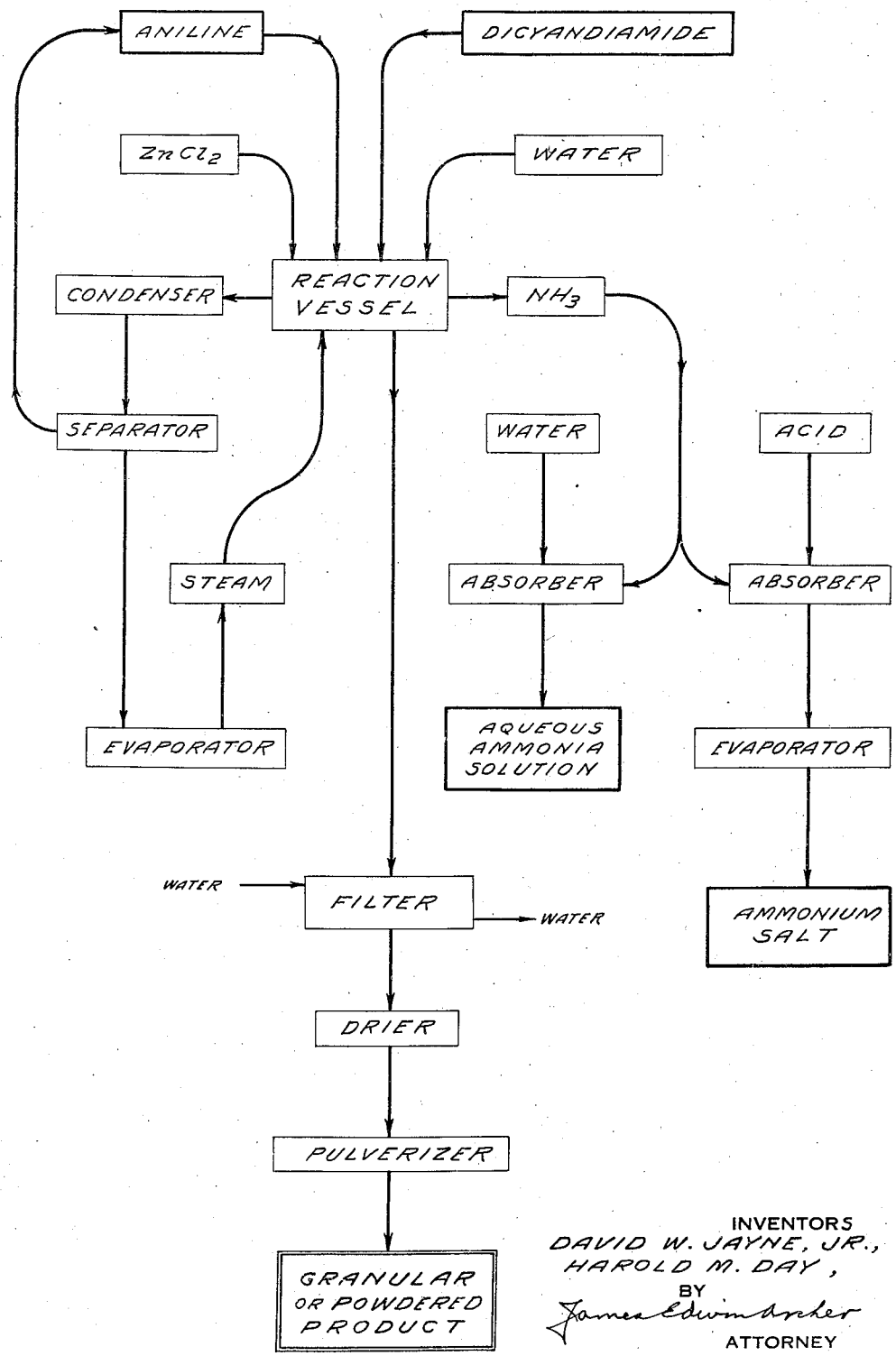

2,482,710

UNITED STATES PATENT OFFICE 2,482,710

PROCESS OF REACTING DICYANDIAMIDE AND ANILINE

David W. Jayne, Jr., Old Greenwich, and Harold M. Day, Cos Cob, Conn., assignors to American Cyanamid Company, New York, N. Y., a corporation of Maine Application March 24, 1945, Serial No. 584,628

1 Claim. (Cl. 260—249.5)

This invention relates to a process for preparing aldehyde-reactive materials suitable for the production of resins starting with dicyandiamide and a primary aromatic amine, such as aniline, as raw materials.

An object of the present invention is to provide a process for the production of thermoreaction products of a primary aromatic amine such as aniline with dicyandiamide which will result in a uniform material of substantially constant composition and which will at the same time produce a product from the primary aromatic amine which may be ground to form a powdery material.

Another object of my invention is to provide an improved process for the reaction of a primary aromatic amine with dicyandiamide wherein excess amine is recovered and wherein the ammonia set free during the reaction is recovered.

These and other objects are attained by heating substantially equimolecular proportions of an aromatic amine such as aniline and dicyandiamide in the presence of a small proportion of a suitable catalyst such as zinc chloride, thereafter removing the excess unreacted aniline, washing the solid reaction product obtained, drying said product and pulverizing the product. The last mentioned and other objects are attained by following the foregoing procedure and by absorbing the ammonia which is set free during the reaction in water or acid and optionally evaporating to form a concentrated aqueous solution of ammonia or to form a solid ammonium salt.

The drawing is a flow sheet showing an embodiment of our invention wherein aniline is reacted with dicyandiamide. Aniline and dicyandiamide together with a small proportion of a suitable catalyst such as zinc chloride are heated in a reaction vessel. When the reaction is complete, water is added and steam is passed into the reaction vessel to steam-distill off the unreacted aniline which passes into a condenser, and after condensation the condensate is allowed to separate into two phases in a separator. The aniline phase is drawn off and returned to the aniline make-up for succeeding cycles of the process, whereas, the water phase is drawn off from the separator and used as make-up water in an evaporator to supply steam for succeeding steam distillation operations. After the aniline is removed by steam distillation the solid reaction product remaining in the reaction vessel mixed with water is filtered and washed with water in the filter. The filter cake is dried and then pulverized to form a granular powder or powdered product which is suitable for the condensation of formaldehyde to form a material which may be used in the manufacture of a variety of products, including adhesives, molding powders, laminating syrups, paper treating chemicals, etc.

During the reaction of the dicyandiamide and aniline, ammonia is given off and this may be absorbed in water to form an aqueous ammonia solution or in acid to form a solution of an ammonium salt which may be concentrated in a suitable evaporator to form a solid ammonium salt. If desired, the aqueous solution may be evaporated to form a concentrated solution of ammonia in water. In another embodiment of our invention the ammonia is compressed and dried to produce liquid ammonia.

The following example in which the proportions are in parts by weight are given by way of illustration and not in limitation.

*Example*

|  | Parts |
|---|---|
| Aniline | 165 |
| Dicyandiamide | 149 |
| Zinc chloride | 3 |

This mixture is heated in a suitable reaction vessel provided with an agitator and a reflux condenser. Heating is continued until the temperature is about 185° C. Ammonia is evolved in the process equivalent to about 0.3 mol of ammonia to 1 mol of dicyandiamide.

The reaction product prepared above is cooled to about 130° C. and water is added slowly with agitation. The unreacted aniline is then completely removed from the reaction mixture by steam distillation. The aqueous slurry of the solid reaction product is cooled and filtered. The filter cake is washed with water, dried and pulverized to obtain a yield of about 170 parts of product.

The recovered aniline is used in the next batch, and the aqueous filtrate from the steam distillation residue is used as make-up water for steam distillation in the next batch. Except for mechanical losses the yields of product over a number of cycles of the process are nearly quantitative.

The primary aromatic amines which are suitable for use according to our invention include aniline and the primary aromatic amines which boil above about 180° C. Examples of suitable amines other than aniline are o-toluidine, each of the other toluidines, each of the xylidines, each of the diphenyl amines, each of the diamino-diphenyls such as p,p'-diamino-diphenyl, the naphthyl amines, etc. Various mixtures of the amines may also be used. The amines should be in the form of the free base and not in the form of salts thereof in order to obtain our products.

The ratio of the aromatic amine to dicyandiamide should be between about 2:1 and 1:2. However, we find that for economical operation it is generally preferable to have the molal ratio of the amine to dicyandiamide near or approximately 1:1. We have found that when the ratio of amine to dicyandiamide is below about 1:2 products are obtained which, without steam distillation, are suitable for reaction with aldehydes and may be granulated easily and, therefore, the use of such ratios is not contemplated in accordance with this invention.

The temperature of the reaction mixture of aromatic amine and dicyandiamide is preferably raised gradually up to about 180-190° C. and at around this point an exothermic reaction begins which will sometimes cause the temperature to rise somewhat higher. The reaction is preferably carried out in a reaction vessel provided with a reflux condenser and it is then possible to remove heat relatively rapidly by refluxing the excess aniline as the reaction proceeds and as the exothermic heat is given up. This causes the temperature to remain substantially constant in the neighborhood of 185° C.

Our reaction of amine and dicyandiamide is carried out at ordinary pressures, preferably at atmospheric pressure. By ordinary pressures we mean any pressure up to about three atmospheres.

We have found that products prepared in accordance with the present invention repeatedly have about 0.3-0.4 mol of ammonia set free per mol of dicyandiamide and that the product contains about 0.2-0.4 mol of aniline per mol of dicyandiamide, the aniline being reacted with the dicyandiamide and not as free aniline.

During our process of heating dicyandiamide and aniline the amount of ammonia liberated is substantial, that is, it is between about 0.1 and about 0.5 mol of ammonia per mol of dicyandiamide.

It is preferable that the ammonia be recovered for economical reasons and, therefore, the ammonia is ordinarily absorbed in water or acid, or both. If the ammonia is absorbed in acid any desired ammonium salt such as ammonium nitrate or ammonium chloride may be obtained as a by-product by the use of the proper acid to give the desired salt.

The thermal reaction of the aromatic amine and dicyandiamide is carried out under substantially anhydrous conditions in order to obtain the desired products. By the term "substantially anhydrous conditions," we contemplate the use of ordinary dry commercial materials without the addition of water to the reactants. While products produced in accordance with the present invention are primarily useful in the manufacture of resinous materials by reaction thereof with aldehydes, they may be used for many other purposes. Thus for example they are useful in the manufacture of dye-stuffs and for the prevention of gas-fading of dyed cellulose acetate. They may also be used in accelerating curing of floor covering compositions.

Products prepared in accordance with this invention may be reacted with an aldehyde such as formaldehyde in the same proportions and under the same conditions as described in our copending application Serial No. 381,140 filed February 28, 1941, now Patent No. 2,389,150, issued November 13, 1945. The resinous products are very similar, in physical and chemical characteristics, to the products obtained according to the aforementioned application and they may be utilized in the same fields, such as in coating compositions, molding compositions, adhesives, textile treating, paper treating, laminating, as binders for abrasives, etc. Condensation products of the materials prepared in accordance with this invention with one or more aldehydes may also be prepared by using such materials in admixture with other aldehyde-reactive substances such as urea, phenol, the cresols, and melamine and other aminotriazines, etc. Furthermore, condensation products of aldehydes with materials produced in accordance with this invention may be alkylated by reacting them with an alcohol and such products are especially suitable for use in coating compositions to produce finishes on wood, metal, etc.

Obviously, many modifications and variations in the processes and compositions described herein may be made without departing from the spirit and scope of the invention as defined in the appended claim.

We claim:

A process which comprises heating, under substantially anhydrous conditions at ordinary pressure, about equimolecular proportions of aniline and dicyandiamide in the presence of 2%, based on the weight of dicyandiamide, zinc chloride as a catalyst at temperature and for a time sufficient to liberate a substantial quantity of ammonia, whereby part of the aniline reacts with the dicyandiamide and ammonia is evolved, absorbing the ammonia which is evolved in an aqueous medium containing a strong mineral acid, whereby an aqueous solution of ammonium salt of said acid is formed, evaporating said solution to recover a solid ammonium salt, steam-distilling the non-gaseous reaction products of the dicyandiamide and the aniline to remove unreacted aniline, condensing the vapors obtained by steam distillation to form a condensate, separating said condensate into an essentially aqueous fraction and an essentially aniline fraction, utilizing said essentially aniline fraction for reaction with further quantities of dicyandiamide and evaporating said essentially aqueous fraction to form steam which is used for steam distillation of further quantities of reaction products obtained by the reaction of dicyandiamide and aniline, in accordance with the process of this claim.

DAVID W. JAYNE, Jr.
HAROLD M. DAY.

REFERENCES CITED

The following references are of record in the file of this patent:

UNITED STATES PATENTS

| Number | Name | Date |
|---|---|---|
| 1,322,757 | Carpenter | Nov. 25, 1919 |
| 1,589,809 | Marquard | July 22, 1926 |
| 2,149,709 | Rein | Mar. 7, 1939 |
| 2,206,603 | Foster | July 2, 1940 |
| 2,222,350 | Keller | Nov. 19, 1940 |
| 2,223,333 | Thurston | Nov. 26, 1940 |
| 2,262,935 | Hill | Nov. 28, 1941 |

FOREIGN PATENTS

| Number | Country | Date |
|---|---|---|
| 491,163 | Great Britain | Aug. 29, 1938 |

OTHER REFERENCES

Beilstein, "Handbuch der org. Chemie," vol. III (2d supp.), p. 76.